(12) United States Patent
Bixel

(10) Patent No.: US 6,355,987 B1
(45) Date of Patent: Mar. 12, 2002

(54) POWER CONVERTER AND CONTROL FOR MICROTURBINE

(75) Inventor: Paul S. Bixel, Salem, VA (US)

(73) Assignee: General Electric Company, Schenectady, NY (US)

( * ) Notice: Subject to any disclaimer, the term of this patent is extended or adjusted under 35 U.S.C. 154(b) by 12 days.

(21) Appl. No.: 09/605,011

(22) Filed: Jun. 27, 2000

(51) Int. Cl.[7] ................................................ H02P 9/00
(52) U.S. Cl. .......................................... 290/52; 322/28
(58) Field of Search ........................ 290/3, 32, 30 R, 290/41, 52; 123/2, 3; 322/28

(56) References Cited

U.S. PATENT DOCUMENTS

| | | | | |
|---|---|---|---|---|
| 5,903,116 A | * | 5/1999 | Geis et al. | 318/140 |
| 6,020,713 A | * | 2/2000 | Geis et al. | 318/801 |
| 6,023,135 A | * | 2/2000 | Gilbereth et al. | 318/140 |
| 6,031,294 A | * | 2/2000 | Geis et al. | 290/52 |
| 6,093,975 A | * | 7/2000 | Peticolas | 290/52 |
| 6,265,786 B1 | * | 7/2001 | Bosley et al. | 290/52 |
| 6,274,945 B1 | * | 8/2001 | Gilbreth et al. | 290/52 |
| 6,281,596 B1 | * | 8/2001 | Gilbreth et al. | 290/52 |
| 6,281,601 B1 | * | 8/2001 | Edelman et al. | 307/29 |
| 6,294,842 B1 | * | 9/2001 | Skowronski | 290/7 |
| 2001/0030425 A1 | * | 10/2001 | Gilbeth et al. | 290/52 |

* cited by examiner

Primary Examiner—Nicholas Ponomarenko
(74) Attorney, Agent, or Firm—Hunton & Williams

(57) ABSTRACT

An arrangement and method for controlling a microturbine. Back-to-back inverters are provided such that a second inverter provides power to the DC bus prior to achieving self-sustaining operation of the turbine, and a first converter provides power to the DC bus and optionally controls its voltage once the turbine is self-sustaining. The second inverter operates in either AC utility voltage and frequency control mode or output current control mode depending upon the needs of the application.

73 Claims, 5 Drawing Sheets

POWER CONVERTER AND CONTROL FOR MICROTURBINE

BACKGROUND OF THE INVENTION

The present invention relates generally to microturbine generator systems and the like. More particularly, the present invention relates to a power bridge topology and control techniques for a microturbine generator system.

Lower cost PWM inverter technology and electric utility deregulation have led to the demand for small (<10 MW) turbo-electric generation machines. Sometimes referred to as microturbines, they are small, high-speed generator power plants that typically include a turbine, compressor, and generator, all of which are on a single shaft, as well as the power electronics to deliver the power to the grid. Microturbines typically have only one moving part, use air bearings and need no lubricating oil. These small power plants operate on natural gas, diesel, gasoline or other similar high-energy, fossil fuel.

It is generally desirable for a microturbine to include a method or components to start the turbine and a method or components to efficiently convert electrical power generated by the turbine into useful (e.g., 60/50 Hz) electricity.

Certain turbogenerator and motor control techniques are known. U.S. Pat. No. 5,903,116 discloses a turbogenerator/motor controller with a microprocessor-based inverter having multiple modes of operation. To start the turbine, the inverter connects to and supplies fixed current, variable voltage, variable frequency, AC power to a permanent-magnet (PM) turbogenerator/motor, driving the PM turbogenerator/motor as a motor to accelerate the gas turbine. Once self-sustaining operation is reached, the inverter is disconnected from the PM generator/motor, reconfigured to a controlled 60 Hertz mode, and then either supplies regulated 60 Hz three phase to a stand alone load or phase locks to the utility, or to other like controllers, to operate as a supplement to the utility. In this mode of operation, the power for the inverter is derived from the PM generator/motor via high frequency rectifier bridges. The microprocessor monitors turbine conditions and controls fuel flow to the gas turbine combustor.

U.S. Pat. No. 6,020,713 discloses a method of rectifying the output of a microturbine generator. A controller is provided for a permanent magnet turbogenerator/motor having a pulse width modulated inverter and a rectifier bridge. The PWM inverter includes a positive section DC bus and a separate equal negative section DC bus, and the inverter has a positive section connected to one magnetic winding of the PMG and a negative section connected to a separate magnetic winding of the PMG.

U.S. Pat. No. 6,023,135 discloses a method of controlling a permanent magnet turbogenerator/motor in which electrical power is provided to a permanent magnet turbogenerator/motor through a pulse width modulated inverter to start the permanent magnet turbogenerator/motor to achieve self-sustaining operation. Electrical power is disconnected from the pulse width modulated inverter once self-sustaining operation is achieved, and the pulse width modulated inverter is reconfigured to supply voltage from the permanent magnet turbogenerator/motor. In addition, and exhaust gas temperature from the permanent magnet turbogenerator/motor is maintained at a substantially constant value while supplying voltage.

U.S. Pat. No. 6,031,294 discloses a method of controlling a permanent magnet turbogenerator/motor in which utility electrical power is provided to the permanent magnet turbogenerator/motor through a pulse width modulated inverter to start the permanent magnet turbogenerator/motor to achieve self-sustaining operation, the utility electrical power is disconnected from the pulse width modulated inverter once self sustaining operation is achieved, the pulse width modulated inverter is reconfigured to supply voltage from the permanent magnet turbogenerator/motor, and an energy storage and discharge system is provided for the pulse width modulated inverter to provide electrical energy to the inverter when utility electrical power is unavailable to start the permanent magnet turbogenerator/motor and during self-sustained operation when the turbogenerator cannot meet an instantaneous load requirement and to otherwise store electrical energy during self-sustained operation.

Known turbogenerator and motor control techniques for microturbines such as those described above do not adequately address techniques for controlling DC bus voltage, which is important for optimal operation and control of the PWM inverter. They also do not provide for operation with AC Induction generators since they are unable to supply reactive currents to the generator.

Therefore, it would be desirable to provide a novel and unique technique for producing power from a microturbine which is highly efficient, cost-effective, and which requires relatively low maintenance and can work with either PMG or induction machines.

It would also be desirable for such a technique to specifically address the problem of controlling DC bus voltage in a microturbine and reduce the number of moving mechanical parts included in the system.

It would further be desirable for such a control arrangement to be able to maintain exhaust gas temperature while voltage is being provided, and to include an energy storage and discharge system for the pulse width modulated inverter to provide electrical energy to the inverter when utility electrical power is unavailable to start the permanent magnet turbogenerator/motor (or induction machine) and during self-sustained operation when the turbogenerator cannot meet an instantaneous load requirement and to otherwise store electrical energy during self-sustained operation.

SUMMARY OF THE INVENTION

The present invention overcomes the above-noted shortcomings of the prior art, and achieves additional advantages, by providing for a back to back PWM inverter topology and method for controlling its DC bus voltage. According to exemplary embodiments described below, a microturbine controller includes a permanent magnet generator connected to the turbine, a first converter connected to the permanent magnet generator, and a second converter connected to the first converter and to an electric utility interface. The bus voltage of a DC bus connected to the first and second converters is controlled by the second converter in a first mode of operation, and is controlled by the first converter in a second mode of operation. The second converter operates to control an output voltage or current in the second mode.

A microturbine controller in accordance with the present invention provides a reliable, efficient, and easily maintainable solution to start the microturbine, control a DC bus voltage associated with the microturbine, and generate power, and achieves additional advantages.

BRIEF DESCRIPTION OF THE DRAWINGS

The present invention will be more fully understood by reading the following Detailed Description of Preferred Embodiments in conjunction with the accompanying drawing, in which.

DETAILED DESCRIPTION OF THE INVENTION

Figure 1:
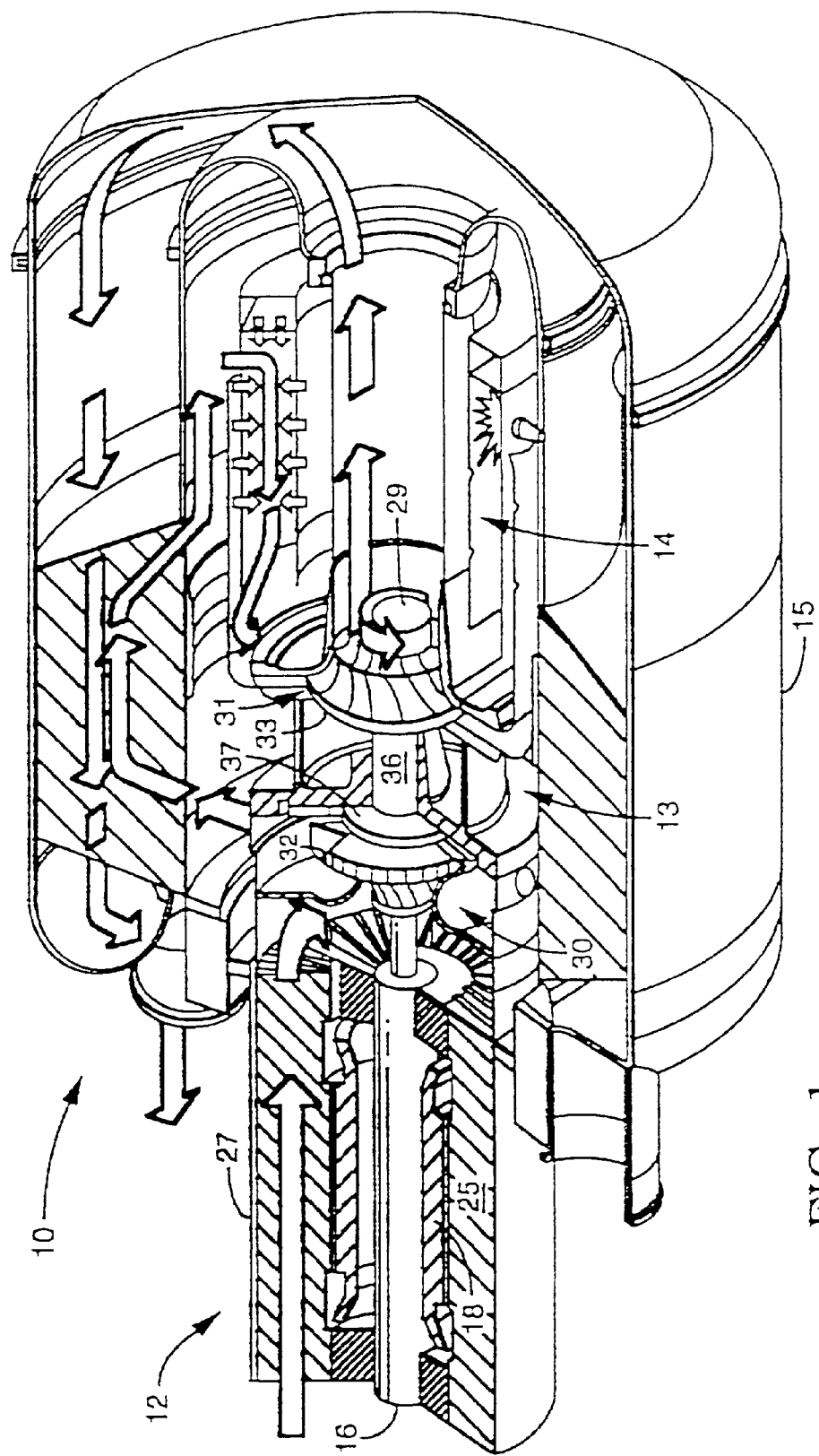
FIG. 1 is a cut away perspective view of a permanent magnet turbogenerator/motor.

A known permanent magnet turbogenerator/motor 10 is illustrated in FIG. 1 as an example of a turbogenerator/motor utilizing the gas turbine engine control system of the present invention. The permanent magnet turbogenerator/motor 10 generally comprises a permanent magnet generator 12, a power head 13, a combustor 14 and a recuperator (or heat exchanger) 15.

The permanent magnet generator 12 includes a permanent magnet rotor or sleeve 16, having a permanent magnet disposed therein, rotatably supported within a permanent magnet stator 18 by a pair of spaced journal bearings. Radial permanent magnet stator cooling fins 25 are enclosed in an outer cylindrical sleeve 27 to form an annular air flow passage which cools the permanent magnet stator 18 and thereby preheats the air passing through on its way to the power head 13.

The power head 13 of the permanent magnet turbogenerator/motor 10 includes compressor 30, gas turbine 31, and bearing rotor 36 through which the tie rod 29 passes. The compressor 30, having compressor impeller or wheel 32 which receives preheated air from the annular air flow passage in cylindrical sleeve 27 around the permanent magnet stator 18, is driven by the gas turbine 31 having turbine wheel 33 which receives heated exhaust gases from the combustor 14 supplied with air from recuperator 15. The compressor wheel 32 and turbine wheel 33 are rotatably supported by bearing shaft or rotor 36 having radially extending bearing rotor thrust disk 37. The bearing rotor 36 is rotatably supported by a single journal bearing within the center bearing housing while the bearing rotor thrust disk 37 at the compressor end of the bearing rotor 36 is rotatably supported by a bilateral thrust bearing. The bearing rotor thrust disk 37 is adjacent to the thrust face at the compressor end of the center bearing housing while a bearing thrust plate is disposed on the opposite side of the bearing rotor thrust disk 37 relative to the center housing thrust face.

Intake air is drawn through the permanent magnet generator 12 by the compressor 30 which increases the pressure of the air and forces it into the recuperator 15. In the recuperator 15, exhaust heat from the gas turbine 31 is used to preheat the air before it enters the combustor 14 where the preheated air is mixed with fuel and burned. The combustion gases are then expanded in the gas turbine 31 which drives the compressor 30 and the permanent magnet rotor 16 of the permanent magnet generator 12 which is mounted on the same shaft as the gas turbine 31. The expanded turbine exhaust gases are then passed through the recuperator 15 before being discharged from the turbogenerator/motor 10.

Figure 2:
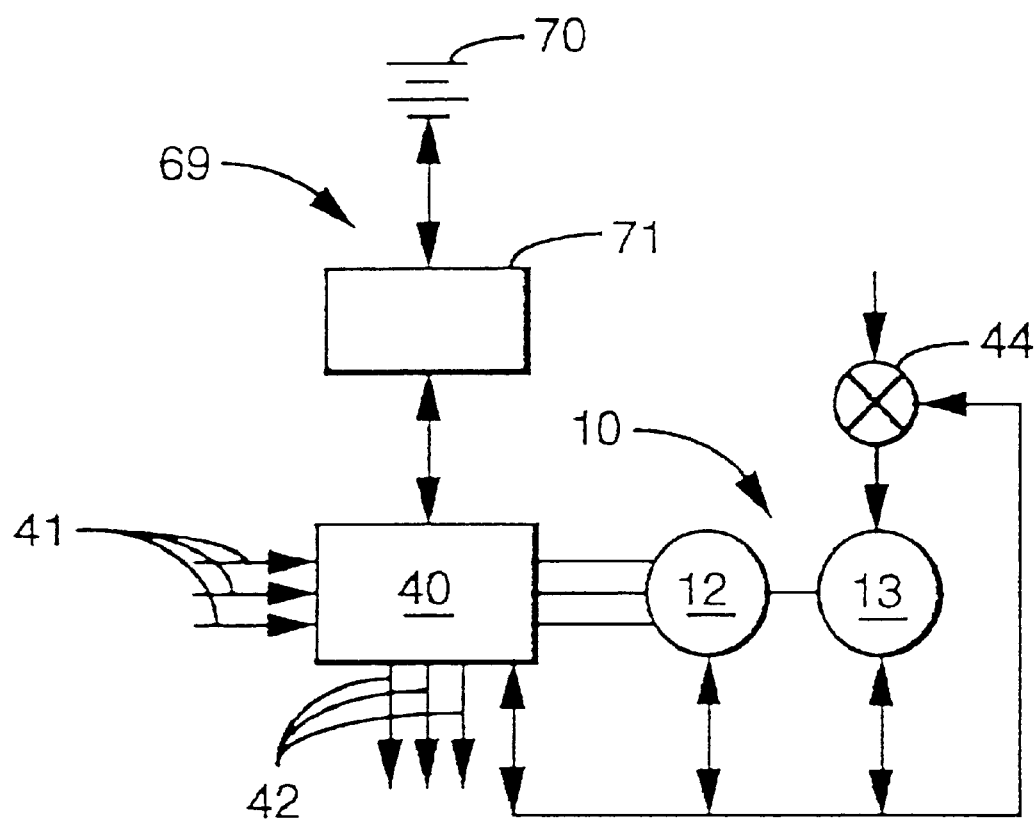
FIG. 2 is a functional block diagram of an interface between the turbogenerator/motor of FIG. 1 and a controller.

A functional block diagram of an interface between the generator controller 40 and the permanent magnet turbogenerator/motor 10 for stand-alone operation is illustrated in FIG. 2. The generator controller 40 receives power 41 from a source such as a utility to operate the permanent magnet generator 12 as a motor to start the turbine 31 of the power head 13. During the start sequence, the utility power 41 is rectified and a controlled frequency ramp is supplied to the permanent magnet generator 12 which accelerates the permanent magnet rotor 16 and the compressor wheel 32, bearing rotor 36 and turbine wheel 33. This acceleration provides an air cushion for the air bearings and airflow for the combustion process. At about 12,000 rpm, spark and fuel are provided and the generator controller 40 assists acceleration of the turbogenerator 10 up to about 40,000 rpm to complete the start sequence. The fuel control valve 44 is also regulated by the generator controller 40.

Once self sustained operation is achieved, the generator controller 40 operates in a manner to be described below to produce 60 hertz, three phase AC (208 volts) power on lines 42 from the rectified high frequency AC output (280–380 volts) of the high speed permanent magnet turbogenerator 10. The permanent magnet turbogenerator 10 is commanded to a power set point with speed varying as a function of the desired output power. For grid connect applications, output lines 42 are connected to input lines 41, and these terminals are then the single grid connection.

The generator controller 40 also includes an energy storage and discharge system 69 having an ancillary electric storage device 70 which is connected through control electronics 71. This connection is bi-directional in that electrical energy can flow from the ancillary electric storage device 70 to the generator controller 40, for example during turbogenerator/motor start-up, and electrical energy can also be supplied from the turbogenerator/motor controller 40 to the ancillary electric storage device 70 during sustained operation.

While the ancillary electric energy device 70 is schematically illustrated as an electric storage battery, other electric energy storage devices can be utilized. By way of example, these would include flywheels, high energy capacitors and the like.

Figure 3:
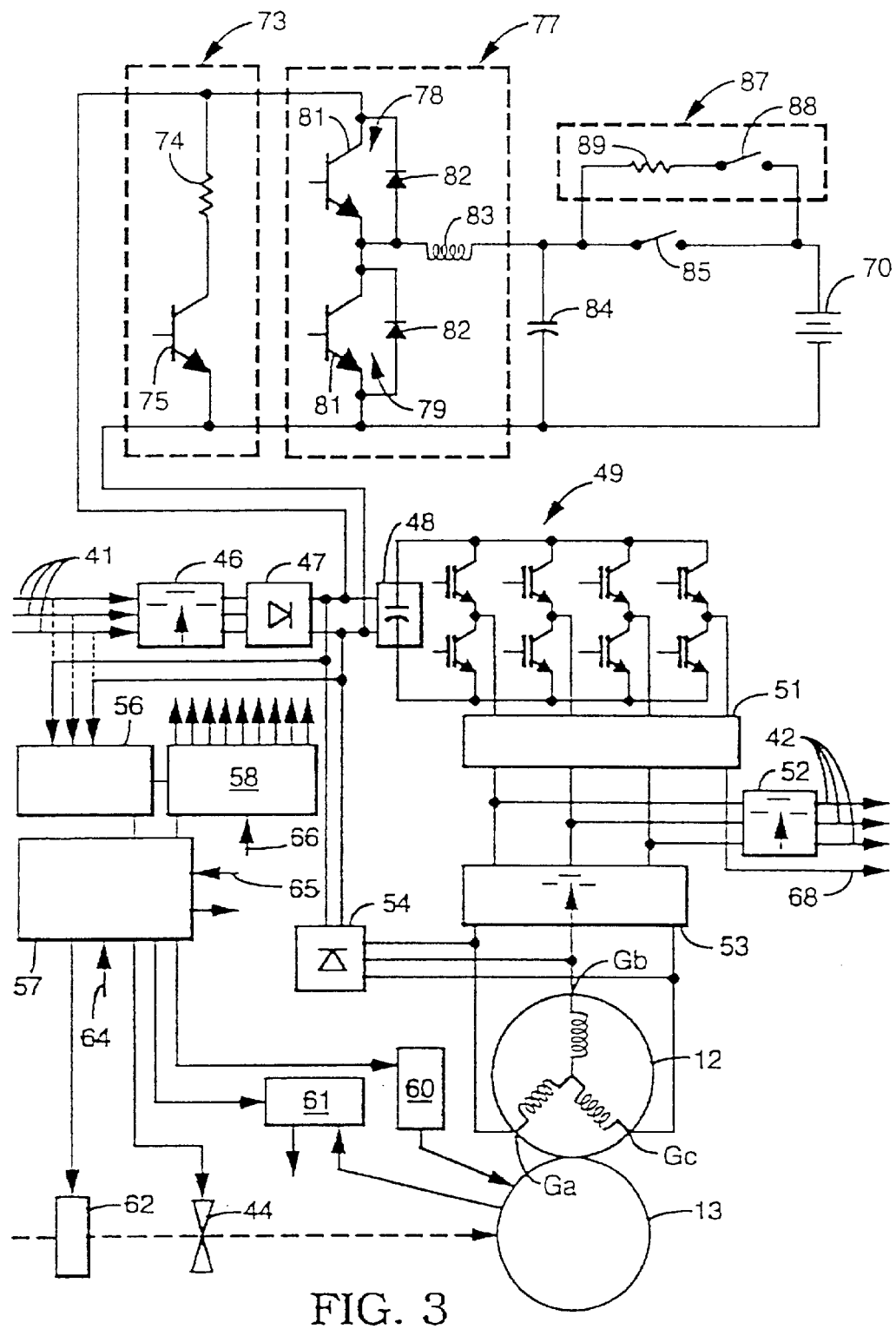
FIG. 3 is a functional block diagram of a known control arrangement.

The functional blocks internal to a known generator controller 40 are illustrated in FIG. 3. In this known embodiment, the generator controller 40 includes in series a start power contactor 46, rectifier 47, DC bus capacitors 48, pulse width modulated (PWM) inverter 49, AC output filter 51, output contactor 52, generator contactor 53, and permanent magnet generator 12. The generator rectifier 54 is connected from between the rectifier 47 and bus capacitors 48 to between the generator contactor 53 and permanent magnet generator 12. The AC power output 42 is taken from the output contactor 52 while the neutral is taken from the AC filter 51.

The control logic section consists of control power supply 56, control logic 57, and solid state switched gate drives illustrated as integrated gate bipolar transistor (IGBT) gate drives 58, but may be any high speed solid state switching device. The control logic 57 receives a temperature signal 64 and a current signal 65 while the IGBT gate drives 58 receive a voltage signal 66. The control logic 57 sends control signals to the fuel cutoff solenoid 62, the fuel control valve(s) 44 (which may be a number of electrically controlled valves), the ignitor 60 and release valve 61. AC power 41 is provided to both the start power contactor 46 and in some instances directly to the control power supply 56 in the control logic section of the generator controller 40 as shown in dashed lines.

Utility start power on lines 41, (for example, 208 AC voltage, 3 phase, 60 hertz), is connected to the start power contactor 46 through fuses (not shown). The start power contactor 46 may consist of a first normally open relay and a second normally closed relay, both of which are de-energized at start up. Alternately, both relays may be normally open and the control power supply 56 receives input directly from utility power input 41. Flameproof power resistors can parallel the relays to provide a reduced current (approximately 10 amps maximum) to slowly charge the internal bus capacitors 48 through the rectifier 47 to avoid drawing excessive inrush current from the utility. Once the bus capacitors 48 are substantially charged, (to approximately 180 VDC, or 80% of nominal), the control power supply 56 starts to provide low voltage logic levels to the control logic 57. Once the control logic microprocessor has completed self tests, coil power is provided to first normally open relay of the start power contactor 46 to fully charge the bus capacitors 48 to fill peak line voltage. The bus capacitors 48 can be supplemented for high frequency filtering by additional film type (dry) capacitors.

The energy storage and discharge system 69 (see also FIG. 2) is connected to the controller 40 across the voltage bus $V_{bus}$ between the rectifier 47 and DC bus capacitor 48 together with the generator rectifier 43. The energy storage and discharge system 69 includes an off-load device 73 and ancillary energy storage and discharge switching devices 77 both connected across voltage bus $V_{bus}$. The off-load device 73 includes an off-load resistor 74 and an off-load switching device 75 in series across the voltage bus $V_{bus}$. The ancillary energy storage and discharge switching device 77 comprises a charge switching device 78 and a discharge switching device 79, also in series across the voltage bus $V_{bus}$. Each of the charge and discharge switching devices 78, 79 include a solid state switched gate drive 81, shown as an integrated gate bipolar transistor (IGBT) gate drive and an anti-parallel diode 82. Capacitor 84 and ancillary storage and discharge device 70, illustrated as a battery, are connected across the discharge switching device 79 with main power relay 85 between the capacitor 84 and the ancillary energy storage and discharge device 70. Inductor 83 is disposed between the charge switching device 78 and the capacitor 84. A precharge device 87, consisting of a precharge relay 88 and precharge resistor 89, is connected across the main power relay 85.

The PWM inverter 49 operates in two basic modes: a variable voltage (0–190 V line to line), variable frequency (0–700 hertz) constant volts per hertz, three phase mode to drive the permanent magnet generator/motor 12 for start up or cool down when the generator contactor 52 is closed; or a constant voltage (120 V line to neutral per phase), constant frequency three phase 60 hertz mode. The control logic 57 and IGBT gate drives 58 receive feedback via current signal 65 and voltage signal 66, respectively, as the turbine generator is ramped up in speed to complete the start sequence. The PWM inverter 49 is then reconfigured to provide 60 hertz power, either as a current source for grid connect, or as a voltage source. The generator contactor 53 connects the permanent magnet generator 12 to the inverter 49 during the start sequence. Initial starting current approximates nominal operating current for about 2 seconds then reduces to a lower value for the balance of the acceleration period. After the start sequence is completed, the generator 12 produces enough output voltage at the output terminals of the generator rectifier 54 to provide three phase regulated output from the inverter 49, so both the start contactor 46 and generator contractor are opened and the system is then self sustaining.

During startup of the permanent magnet turbogenerator/motor 10, both the start power contactor 46 and the generator contactor 53 are closed and the output contactor 52 is open. Once self sustained operation is achieved, the start power contactor 46 and the generator contactor 53 are opened and the PWM inverter 49 is reconfigured to a controlled 60 hertz mode. After the reconfiguration of the PWM inverter 49, the output contactor 52 is closed to connect the AC output 42. The start power contactor 46 and generator contactor 53 will remain open.

The PWM inverter 49 in the embodiment of FIG. 3 is truly a dual function inverter which is used both to start the permanent magnet turbogenerator/motor 10 and is also used to convert the permanent magnet turbogenerator/motor output to utility power, either sixty hertz, three phase for stand alone applications, or as a current source device. With start power contactor 46 closed, single or three phase utility power is brought through the start power contactor 46 to be able to operate into a bridge rectifier 47 and provide precharged power and then start voltage to the bus capacitors 48 associated with the PWM inverter 49. This allows the PWM inverter 49 to function as a conventional adjustable speed drive motor starter to ramp the permanent magnet turbogenerator/motor 10 up to a speed sufficient to start the gas turbine 31.

An additional rectifier 54, which operates from the output of the permanent magnet turbogenerator/motor 10, accepts the three phase, up to 380 volt AC from the permanent magnet generator/motor 12 which at full speed is 1600 hertz and is classified as a fast recovery diode rectifier bridge. Six diode elements arranged in a classic bridge configuration comprise this high frequency rectifier 54 which provides output power at DC. The rectified voltage is as high as 550 volts under no load. The permanent magnet turbogenerator/motor 10 is basically started at zero frequency and rapidly ramps up to approximately 12,000 rpm. This is a two pole permanent magnet generator/motor 12 and as a result 96,000 rpm equals 1,600 hertz. Therefore 12,000 rpm is ⅛th of that or 200 hertz. It is operated on a constant volt per hertz ramp, in other words, the voltage that appears at the output terminals is ⅛th of the voltage that appears at the output terminals under full speed.

Approximate full speed voltage is 380 volts line to line so it would be approximately ⅛th of that. When the PWM inverter 49 has brought the permanent magnet turbogenerator/motor 10 up to speed, the fuel solenoid 62, fuel control valve 44 and ignitor 60 cooperate to allow the combustion process to begin. Using again the adjustable speed drive portion capability of the PWM inverter 49, the permanent magnet turbogenerator/motor 10 is then accelerated to approximately 35,000 or 40,000 rpm at which speed the gas turbine 31 is capable of self sustaining operation. The AC filter 51 is a conventional single pass LC filter which simply removes the high frequency, in this case approximately twenty kilohertz, switching component. Because the voltage in start mode is relatively low, its rectified 208 volt line which is approximately 270 volts, a single bus capacitor 48 is capable of standing that voltage. However, when in generate mode, the DC output of the generator rectifier 54 can supply voltages as high as 550 volts DC, requiring two capacitors to be series connected to sustain that voltage.

The reconfiguration or conversion (required in the embodiment of FIG. 3) of the PWM inverter 49 to be able to operate as a current source synchronous with the utility grid is accomplished by first stopping the PWM inverter 49. The AC output or the grid connect point is monitored with a separate set of logic monitoring to bring the PWM inverter 49 up in a synchronized fashion. The generator contactor 53 functions to close and connect only when the PWM inverter 49 needs to power the permanent magnet turbogenerator/motor 10 which is during the start operation and during the cool down operation. The output contactor 52 is only enabled to connect the PWM inverter 49 to the grid once the PWM inverter 49 has synchronized with grid voltage.

The implementation of the control power supply 56 first drops the control power supply 56 down to a 24 volt regulated section to allow an interface with a battery or other control power device. The control power supply 56 provides the conventional logic voltages to both the IGBT gate drives 58 and control logic 57. The IGBT gate drives 58 have two isolated low voltage sources to provide power to each of the two individual IGBT drives and the interface to the IGBT transistors is via a commercially packaged chip.

The off-load device 73, including off-load resistor 74 and off-load switching device 75 can absorb thermal energy from the turbogenerator 10 when the load terminals are disconnected, either inadvertently or as the result of a rapid change in load. The off-load switching device 75 will turn on proportionally to the amount of off-load required and essentially will provide a load for the gas turbine 31 while the fuel is being cut back to stabilize operation at a reduce level. The system serves as a dynamic brake with the resistor connected across the DC bus through an IGBT and serves as a load on the gas turbine during any overspeed condition.

In addition, the ancillary electric storage device 70 can continue motoring the turbogenerator 10 for a short time after a shutdown in order to cool down the turbogenerator 10 and prevent the soak back of heat from the recuperator 15. By continuing the rotation of the turbogenerator 10 for several minutes after shutdown, the power head 13 will keep moving air and sweep heat away from the permanent magnet generator 12. This keeps heat in the turbine end of the power head 13 where it will not be a problem.

The battery switching devices 77 are a dual path since the ancillary electric storage device 70 is bi-directional operating from the generator controller 40. The ancillary electric storage device 70 can provide energy to the power inverter 49 when a sudden demand or load is required and the gas turbine 31 is not up to speed. At this point, the battery discharge switching device 79 turns on for a brief instant and draws current through the inductor 83. The battery discharge switching device 79 is then opened and the current path continues by flowing through the diode 82 of the battery charge switching device 78 and then in turn provides current into the inverter capacitor 48.

The battery discharge switching device 79 is operated at a varying duty cycle, high frequency, rate to control the amount of power and can also be used to initially ramp up the controller 40 for battery start operations. After the system is in a stabilized, self-sustaining condition, the battery charge switching device 78 is used exactly in the opposite. At this time, the battery charge switching device 78 periodically closes in a high frequency modulated fashion to force current through inductor 83 and into capacitor 84 and then directly into the ancillary electric storage device 70.

The capacitor 84, connected to the ancillary electric storage device 70 via the precharge relay 88 and resistor 89 and the main power relay 85, is provided to isolate the ancillary electric storage device 70 when it is in an off-state.

The normal, operating sequence is that the precharge relay 88 is momentarily closed to allow charging of all of the capacitive devices in the entire system and them the main power relay 85 is closed to directly connect the ancillary electric storage device 70 with the control electronics 71. While the main power relay 85 is illustrated as a switch, it may also be a solid state switching device.

The ancillary electric storage device 70 is utilized to supplement the gap between the gas turbine 31 coming up to a steady state condition and the requirements of the inverter 49 to supply load. The energy required to support the load is that energy interval between the thermal response time of the gas turbine 31 and the load requirement, which in terms of actual stored energy is relatively small. During an off-load, the energy is dissipated resistively, and simultaneously with that command the fuel flow is cut to a minimum allowable level to sustain combustion in the gas turbine 31 but allow a maximum off-load of power.

Figure 4:
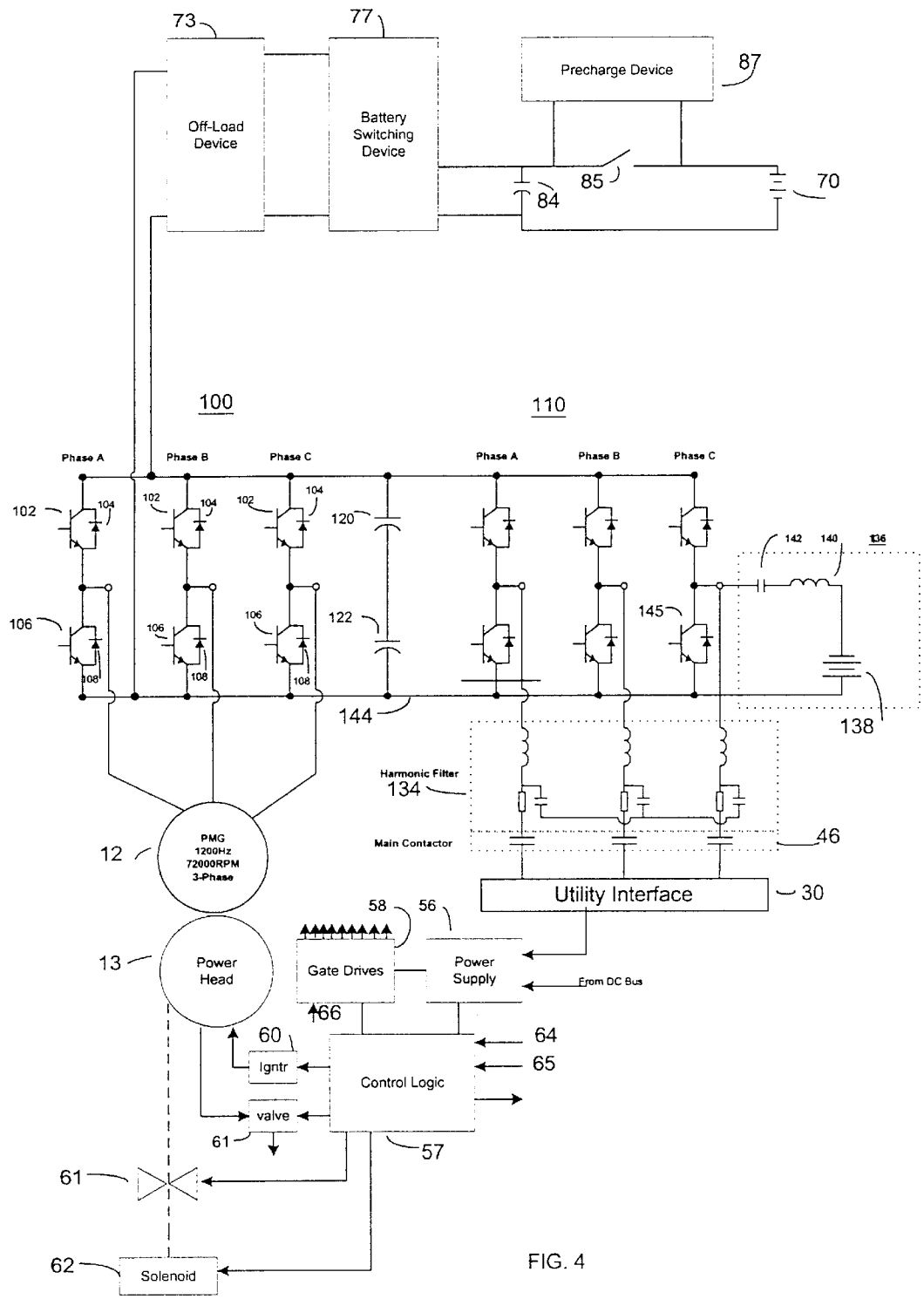
FIG. 4 is a block diagram of a control arrangement according to an embodiment of the present invention.

Referring now to FIG. 4, a diagram of an alternative microturbine control arrangement according to an embodiment of the present invention is shown. It will be appreciated that the arrangement of FIG. 4 advantageously eliminates at least elements 47, 48, 49, 52, 53 and 54 from the embodiment of FIG. 3. In FIG. 4, in a first portion 100 of the arrangement, the Permanent Magnet Generator (PMG) 12 is connected to each of three phase lines (Phase A, Phase B, Phase C), each phase line including an upper insulated gate bipolar transistor (IGBT) 102 and accompanying antiparallel diode 104, and a lower insulated gate bipolar transistor 106 and accompanying antiparallel diode 108.

In the arrangement of FIG. 4, capacitance 48 is implemented by a pair of capacitors 120 and 122, separating the first portion of the arrangement (described above) from a second portion of the arrangement which will now be described.

The second portion 110 of the arrangement includes a similar arrangement of three phase lines, upper and lower IGBTs and corresponding antiparallel diodes. The second portion includes a utility interface 30 connected via main contactor 132 and harmonic filters 134 to the phase lines of the second portion. The utility interface 130 connects to an AC power grid (not shown). The second portion of the arrangement can optionally include a battery starter 136 which includes a DC power source 138, an inductor 140 and a contactor or switch 142.

A DC bus 144 is connected to both the first and second portions of the control arrangement as shown in FIG. 4. The switch 142 is operable to selectively provide a DC voltage from the DC power source to the DC bus 44.

Operational characteristics of the arrangement of FIG. 4 will now be described. During a starting operation of the turbine, DC voltage is impressed on the DC bus 144 either by closing the contactor 132 to rectify AC from the power grid or other AC power source or by modulating IGBT 145. In the AC mode, the grid AC voltage directly controls the DC bus voltage. In the battery switch mode, the modulation of the switch controls the DC bus voltage. The battery switch operation is useful in applications where no grid voltage is available before the turbine is on line and operational.

Once the DC bus voltage has been established, the first portion 100 of the bridge arrangement of FIG. 4 becomes active and controls the switches to produce voltages to cause the permanent magnet generator (PMG) 12 to operate in a first "motoring" mode. This in turn accelerates the PMG 12 and the attached gas turbine (not shown). Once sufficient speed has been produced, fuel and ignition can be introduced to the turbine, which allows the turbine to become self-sustaining, and further accelerate of its own accord.

At approximately this moment (that the turbine starts and becomes self-sustaining), the first portion 100 of the arrangement of FIG. 4 changes from the "motoring mode" (that is, the first mode in which the first portion is active and controls the switches to produce voltage to cause the PMG to operate), and enters into a second operating mode (which will be referred to herein as a DC bus voltage mode). In this DC bus voltage mode, reactive currents can be excited in the PMG 12, as products of voltages produced by the switches, to control the DC bus voltage or the switches may remain inactive allowing currents to be rectified through the anti-parallel diodes, thereby determining the DC bus voltage.

In addition to the first portion 100 of the arrangement of FIG. 4 operating in the DC bus voltage mode, the second portion 110 of the arrangement begins operation at substantially the same time in either an AC utility voltage and frequency control mode or output current control mode depending upon the particular application. That is, the second portion 110 of the arrangement provides either a controlled-frequency AC voltage, or provides a controlled current while the control arrangement is operating in the second mode. The utility-connected section 110 shown in FIG. 4 (i.e., the second portion) is a three-wire pulse width modulated inverter/converter suitable for utility applications. It will be appreciated that other suitable arrangements can be used, such as a four wire, eight switch converter to control neutral currents created by unbalanced loads on the utility.

Further, the output harmonic filter 134 is optional, and can be provided to attenuate voltage harmonics to levels acceptable for applications which require controlled harmonics.

Figure 5:
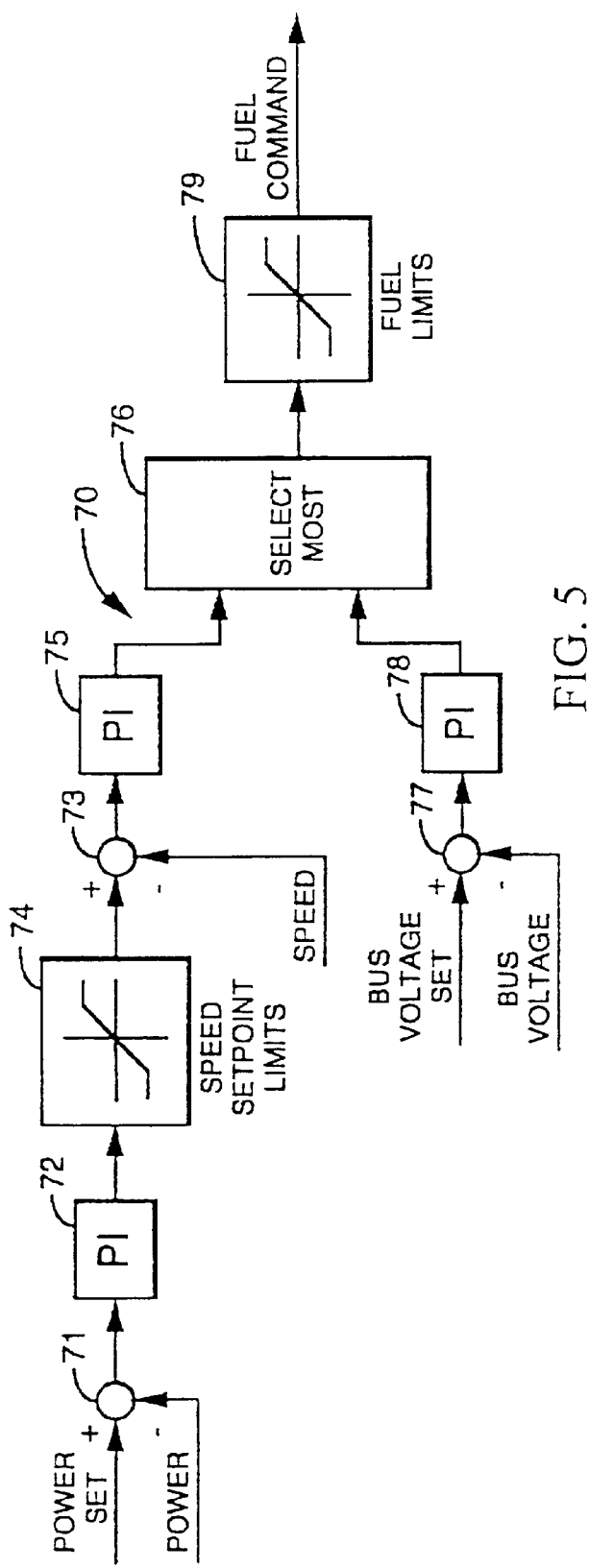
FIG. 5 is a functional block diagram of a fuel command control loop of a turbine control system (in accordance with an embodiment of the present invention)
Figure 6:
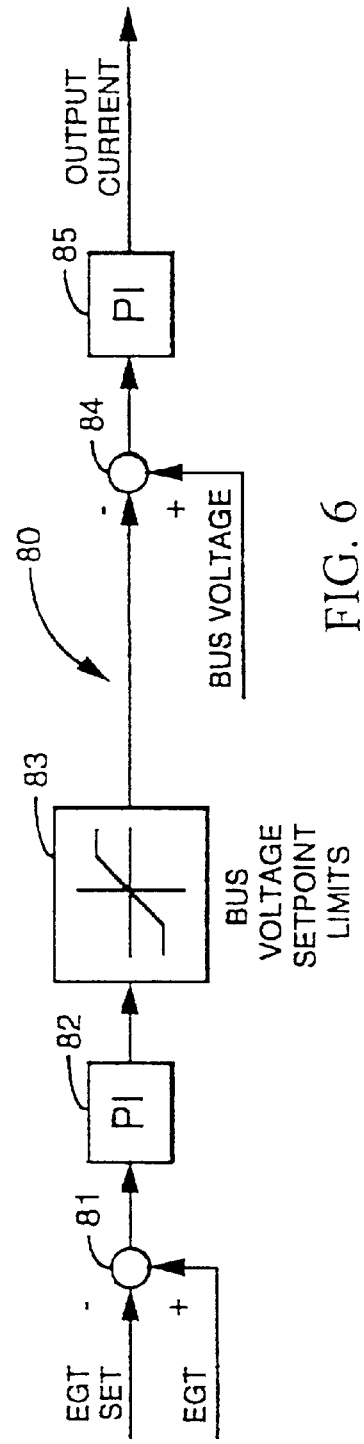
FIG. 6 is a functional block diagram of a current command control loop (in accordance with an embodiment of the present invention).

Once a selected bus voltage and corresponding speed are achieved, and the control arrangement of FIG. 2 provides appropriate output voltages, the proportional integral control loops illustrated in FIGS. 5 and 6 control the operation of the turbogenerator. A fuel command control loop 70 of FIG. 5 includes a power comparator 71 which compares an actual power signal with a power setpoint and provides a signal to a power proportional integral control 72 having a 500 millisecond sampling time.

The output signal from this power proportional integral control 72 is provided to a speed comparator 73 through a speed setpoint limiter 74. The speed comparator 73 compares the speed setpoint with an actual speed signal and provides a signal to the speed proportional integral control 75. The signal from the speed proportional integral control 75, which has a 20 millisecond sampling time, delivers its signal to a selector 76 which also receives a signal from a minimum DC bus voltage proportional integral control 78 also having a 20 millisecond sampling time. This minimum DC bus voltage proportional integral control 78, which receives a signal from an minimum DC bus voltage comparator 77 which compares an actual bus voltage signal with a setpoint bus voltage, controls during no load operation to maintain the speed and hence the bus voltage at the minimum level that is required to be maintained. The selector 76 selects the highest value signal from either the speed proportional integral control 75 or minimum DC bus voltage proportional integral control 78 and provides it to the fuel limiter 79 which produces a fuel command signal to the fuel control valve 44.

The output current or current command control loop 80 is illustrated in FIG. 6. Exhaust gas temperature comparator 81 compares the actual exhaust gas temperature signal with a setpoint exhaust gas temperature to provide a signal to an exhaust gas temperature proportional integral control 82 having a 60 millisecond sampling time. A bus voltage setpoint limitor 83 receives the signal from the exhaust gas temperature proportional integral control 82 and provides a signal to voltage comparator 84 which also receives an actual bus voltage signal. The signal from the voltage comparator 84 is provided to a lower bus voltage proportional integral control 85, having 1 millisecond sampling time, to produce an output current signal.

The gas turbine control system is designed to regulate the operation of the permanent magnet turbogenerator gas turbine engine with the exhaust gas temperature maintained at a constant value to allow for high efficiency over a wide range of power settings. The exhaust gas temperature is only lowered when the bus voltage hits its minimum limit and forces the exhaust gas temperature to decrease.

To increase the power output of the turbogenerator, an increased power setpoint is provided and the speed setpoint of the gas turbine is raised through the power proportional integral control 72. Fuel is then commanded (added) to raise the speed, and power output potential, of the system. Momentarily the exhaust gas temperature is increased while fuel is being added to the gas turbine. Once, however, acceleration begins and the gas turbine speed is increased, air flow through the turbine increases thereby lowering the exhaust gas temperature of the gas turbine. The exhaust gas temperature proportional integral control 82 lowers the DC bus voltage setpoint into the bus voltage comparator 84 and the power output of the turbogenerator system is increased when the lower bus voltage proportional integral control 85 commands more output current to reduce the difference in the value of the comparator 84.

To reduce the power output of the turbogenerator, a decreased power setpoint is provided and the speed setpoint of the gas turbine is decreased through the power proportional integral control 72. Fuel is then commanded (reduced) to lower the speed, and power output potential, of the system. Momentarily the exhaust gas temperature is decreased while fuel is being decreased to the gas turbine. Once, however, deceleration begins and the gas turbine speed is decreased, air flow through the turbine decreases thereby raising the exhaust gas temperature of the gas turbine.

The exhaust gas temperature proportional integral control 82 increases the DC bus voltage setpoint into the bus voltage comparator 84 and the power output of the turbogenerator system is decreased when the lower bus voltage proportional integral control 85 commands less output current to reduce the difference in the value of the comparator 84.

The control loop sampling times are essential when multiple proportional integral controls are used in series. For example, the power proportional integral control 72 must respond at a slower rate to allow the speed proportional integral control 75 to achieve the current speed setpoint before a new setpoint is provided by 72. A similar example occurs with exhaust gas temperature proportional integral control 82 and lower bus voltage proportional integral control 85 are in series.

The timing between the series of proportional integral controls in FIGS. 5 and 6 is essential to stabilizing the control system. Since exhaust gas temperature has a relationship with the fuel command to the gas turbine, it must respond with an adequate amount of time to maintain the exhaust gas temperature setpoint.

The loop timing of the power proportional integral control 72 is also critical. Control is dependent on the response time of the speed and exhaust gas temperature controls, 75 and 82. The output of the gas turbine is related to the speed and temperature. Therefore these parameters must be stabilized before the power proportional integral control receives it next feedback signal.

The stability of the gas turbine control system is thus achieved by setting the sampling times of the different proportional integral controls at different times. The high sampling rate of the speed and voltage proportional integral controls allow the system to settle to a steady state before a new speed setpoint is commanded by the power proportional integral control. This effectively de-couples the interference of the power loop with the lower bus voltage loop.

The efficiency of the gas turbine engine is significantly improved by maintaining the exhaust gas temperature at a constant value. The multi-input, multi-output system effectively controls the turbogenerator operation to achieve maximum power and efficiency.

Although the foregoing description includes numerous details, it will be appreciated that these details have been included solely for the purpose of explaining specific embodiments of the invention. Numerous and significant variations of the details provided above will be readily apparent to persons skilled in the art which will remain within the scope and spirit of the invention, as defined by the following claims and their legal equivalents.

What is claimed is:

1. A turbogenerator/motor control arrangement for connection to an AC power grid, comprising:
    at least one AC generator;
    at least one turbine operatively connected to the generator;
    a first converter operatively connected to the generator;
    a second converter operatively connected between the first converter and an electric utility interface; and
    a DC bus operatively connected to the first and second converters, wherein power is supplied to the DC bus via the second converter during a first starting mode of the turbogenerator and power is supplied to the DC bus by the first converter during the second "generating" mode of the turbogenerator.

2. The arrangement of claim 1, wherein the DC bus voltage is controlled by the first converter in the second mode of the turbogenerator.

3. The arrangement of claim 1, further comprising a switch, inductor, and battery connected in series between the second converter to allow DC bus power to be supplied by the second converter.

4. The arrangement of claim 1, further comprising a harmonic filter connected to the second converter, the harmonic filter attenuating voltage harmonics.

5. The arrangement of claim 1, wherein the first and second converters include a plurality of solid state switches.

6. The arrangement of claim 1, wherein the AC generator is one of a permanent magnet generator or an induction generator.

7. The arrangement of claim 5, wherein the switches are insulated gate bipolar transistors.

8. The arrangement of claim 1, wherein a voltage supplied to the turbogenerator is a utility frequency voltage.

9. The arrangement of claim 1, wherein the second inverter includes three or more solid state switching device channels.

10. The arrangement of claim 9, wherein the three or more solid state switching device channels are IGBT channels.

11. The arrangement of claim 1, further comprising means to maintain an exhaust gas temperature of the generator at a substantially constant value while supplying utility frequency voltage.

12. The arrangement of claim 11, wherein the means to maintain the exhaust gas temperature includes a fuel command proportional integral control loop.

13. The arrangement of claim 11, wherein the means to maintain the exhaust gas temperature includes a current command proportional integral control loop.

14. The arrangement of claim 11, wherein the means to maintain the exhaust gas temperature includes a fuel command proportional integral control loop and a current command proportional integral control loop.

15. The arrangement of claim 12, wherein the fuel command proportional integral control loop includes a power proportional integral control.

16. The arrangement of claim 12, wherein the fuel command proportional integral control loop includes a speed proportional integral control.

17. The arrangement of claim 12, wherein the fuel command proportional integral control loop includes a power proportional integral control and a speed proportional integral control.

18. The arrangement of claim 17, wherein the speed proportional integral control has a higher sampling time than the power proportional integral control.

19. The arrangement of claim 17, wherein said fuel command proportional integral control loop additionally includes a minimum DC bus voltage proportional integral control and a selector to select the highest signal from said speed proportional integral control and said minimum DC bus voltage proportional integral control.

20. The arrangement of claim 13, wherein said current command proportional integral control loop includes an exhaust gas temperature proportional integral control.

21. The arrangement claim 13, wherein said current command proportional integral control loop includes a lower bus voltage proportional integral control.

22. The arrangement of claim 13, wherein said current command proportional integral control loop includes an exhaust gas temperature proportional integral control and a lower bus voltage proportional integral control.

23. The arrangement of claim 22, wherein said lower bus voltage proportional integral control has a higher sampling time than said exhaust gas temperature proportional integral control.

24. The arrangement of claim 11, wherein said means to maintain the exhaust gas temperature from said gas turbine engine of said permanent magnet turbogenerator/motor at a substantially constant value while supplying utility frequency voltage includes a fuel command proportional integral control loop having a power proportional integral control and a speed proportional integral control, and a current command proportional integral control loop having an exhaust gas temperature proportional integral control and a lower bus voltage proportional integral control.

25. The arrangement of claim 24, wherein said speed proportional integral control has a higher sampling time than said power proportional integral control.

26. The arrangement of claim 25, wherein said fuel command proportional integral control loop additionally includes a minimum DC bus voltage proportional integral control and a selector to select the highest signal from said speed proportional integral control and said minimum DC bus voltage proportional integral control.

27. The arrangement of claim 24, wherein said lower bus voltage proportional integral control has a higher sampling time than said exhaust gas temperature proportional integral control.

28. The arrangement of claim 24, wherein said speed proportional integral control has a higher sampling time than said power proportional integral control, and said lower bus voltage proportional integral control has a higher sampling time than said exhaust gas temperature proportional integral control.

29. The arrangement of claim 24, wherein said power proportional integral control has a lower sampling time than said exhaust gas temperature proportional integral control.

30. The arrangement of claim 24, wherein said exhaust gas temperature proportional integral control has a lower sampling time than said speed proportional integral control.

31. The arrangement of claim 24, wherein said speed proportional integral control has a lower sampling time than said lower bus voltage proportional integral control.

32. The arrangement of claim 24, wherein said power proportional integral control has a lower sampling time than said exhaust gas temperature proportional integral control, said exhaust gas temperature proportional integral control has a lower sampling time than said speed proportional integral control, and said speed proportional integral control has a lower sampling time than said lower bus voltage proportional integral control.

33. The arrangement of claim 1, further comprising an energy storage and discharge system operatively connected to at least one of the first and second converters to provide electrical energy to the connected converter, when utility electrical power is unavailable to start the AC generator, during self-sustained operation when the connected converter cannot meet an instantaneous load requirement, after shutdown to continue motoring the turbine of the AC generator to cool down the AC generator, and to otherwise store electrical energy during self-sustained operation.

34. The arrangement of claim 33, wherein said connected converter includes a plurality of solid state switching device channels.

35. The arrangement of claim 34, wherein said plurality of solid state switching device channels in said connected converter is four.

36. The arrangement of claim 35, wherein said four solid state switching device channels are IGBT channels.

37. The arrangement of claim 33, wherein the energy storage and discharge system includes an off-load device having an off-load resistor and an off-load switching device in series, and a switching device having a charge switching device and a discharge switching device in series.

38. The arrangement of claim 37, wherein the energy storage and discharge system includes an energy storage and discharge device connected across said discharge switching device, and said energy storage and discharge device includes a main power switch, and a precharge switch and precharge resistor in parallel with the main power switch.

39. The arrangement of claim 38, wherein the wherein said energy storage and discharge system includes a series inductor and a parallel capacitor between said discharge switching device and said energy storage and discharge device to filter the pulse width modulated waveforn from said charge switching device and said discharge switching device.

40. The arrangement of claim 33, wherein the energy storage and discharge system includes an off-load device having an off-load resistor and an off-load switching device in series, a switching device having a charge switching device and a discharge switching device in series, a battery connected across the discharge switching device, a main power switch in series with the battery, a precharge switch and a precharge resistor in parallel with the main power switch, and a series inductor and a parallel capacitor between the discharge switching device and the battery to filter a pulse width modulated waveform transmitted from the charge switching device and the discharge switching device.

41. A method for controlling a generator, comprising the steps of:
providing electrical power to the generator through a first converter, a second converter, and a DC bus converter operatively connected to the generator, the first and second converters operating in a first mode to achieve self-sustaining operation of the generator or during a cool down cycle of the turbine;
supplying voltage from the generator to the DC bus and to the second converter through the first converter in a second mode of operation.

42. The method of claim 41, further comprising the step of:
providing electrical energy to the first inverter when utility electrical power is unavailable to start the generator and during self-sustained operation when the generator cannot meet an instantaneous load requirement.

43. The method of claim 41, further comprising the step of providing an energy storage and discharge system for the first and second converters to provide electrical energy to the first converter when utility electrical power is unavailable to start the generator and during self sustained operation when the generator cannot meet an instantaneous load requirement and to otherwise store electrical energy during self-sustained operation.

44. The method of claim 41, wherein the DC bus voltage is controlled according to a first technique during the first mode of operation.

45. The method of claim 44, wherein the first technique includes controlling the DC bus voltage based on an AC voltage present on a power grid associated with the generator.

46. The method of claim 44, wherein the DC bus voltage is controlled by a second technique during the second mode of operation.

47. The method of claim 46, wherein the second technique includes controlling the bus voltage by generating voltages from one or more switches associated with the first converter, and producing reactive currents in the generator by providing the generated voltages to the generator.

48. The method of claim 41, further comprising the step of filtering the voltage prior to the step of supplying.

49. A turbine controller, comprising:
an AC generator connected to the turbine;
a first converter connected to the generator;
a second converter connected to the first converter and to an AC power grid; and
a DC bus operatively connected to the first and second converters, wherein power is supplied to the DC bus via the second converter during a first starting mode of the generator and power is supplied to the DC bus by the first converter during a second operating mode of the generator.

50. The controller of claim 49, where in the AC generator is a permanent magnet generator.

51. The controller of claim 49, further comprising:
an energy storage and discharge system for the first and second converters to provide electrical energy to the first converter when utility electrical power is unavailable to start the generator and during self sustained operation when the first converter cannot meet an instantaneous load requirement and to otherwise store electrical energy during self-sustained operation.

52. The controller of claim 49, further comprising an exhaust gas temperature regulator operatively connected to maintain an exhaust gas temperature of the generator at a substantially constant value while supplying power.

53. The controller of claim 52, wherein the regulator includes a fuel command proportional integral control loop.

54. The controller of claim 52, wherein the regulator includes a current command proportional integral control loop.

55. The controller of claim 52, wherein the regulator includes a fuel command proportional integral control loop and a current command proportional integral control loop.

56. The controller of claim 53, wherein the fuel command proportional integral control loop includes a power proportional integral control.

57. The controller of claim 53, wherein the fuel command proportional integral control loop includes a speed proportional integral control.

58. The controller of claim 53, wherein the fuel command proportional integral control loop includes a power proportional integral control and a speed proportional integral control.

59. The controller of claim 58, wherein the speed proportional integral control has a higher sampling time than the power proportional integral control.

60. The controller of claim 58, wherein the fuel command proportional integral control loop additionally includes a minimum DC bus voltage proportional integral control and a selector to select the highest signal from said speed proportional integral control and said minimum DC bus voltage proportional integral control.

61. The controller of claim 54, wherein the current command proportional integral control loop includes an exhaust gas temperature proportional integral control.

62. The controller of claim 54, wherein the current command proportional integral control loop includes a lower bus voltage proportional integral control.

63. The controller of claim 54, wherein the current command proportional integral control loop includes an exhaust gas temperature proportional integral control and a lower bus voltage proportional integral control.

64. The controller of claim 63, wherein said lower bus voltage proportional integral control has a higher sampling time than said exhaust gas temperature proportional integral control.

65. The controller of claim 52, wherein the regulator includes a fuel command proportional integral control loop having a power proportional integral control and a speed proportional integral control, and a current command proportional integral control loop having an exhaust gas temperature proportional integral control and a lower bus voltage proportional integral control.

66. The controller of claim 65, wherein the speed proportional integral control has a higher sampling time than said power proportional integral control.

67. The controller of claim 66, wherein the fuel command proportional integral control loop additionally includes a minimum DC bus voltage proportional integral control and a selector to select the highest signal from said speed proportional integral control and said minimum DC bus voltage proportional integral control.

68. The controller of claim 65, wherein the lower bus voltage proportional integral control has a higher sampling time than said exhaust gas temperature proportional integral control.

69. The controller of claim 65, wherein the speed proportional integral control has a higher sampling time than said power proportional integral control, and said lower bus voltage proportional integral control has a higher sampling time than said exhaust gas temperature proportional integral control.

70. The controller of claim 65, wherein the power proportional integral control has a lower sampling time than said exhaust gas temperature proportional integral control.

71. The controller of claim 65, wherein the exhaust gas temperature proportional integral control has a lower sampling time than said speed proportional integral control.

72. The controller of claim 65, wherein the speed proportional integral control has a lower sampling time than said lower bus voltage proportional integral control.

73. The controller of claim 65, wherein the power proportional integral control has a lower sampling time than said exhaust gas temperature proportional integral control, said exhaust gas temperature proportional integral control has a lower sampling time than said speed proportional integral control, and said speed proportional integral control has a lower sampling time than said lower bus voltage proportional integral control.

* * * * *